Aug. 18, 1970 W. WOLF 3,524,675
SECURING ARRANGEMENT OF THE ROD FOR THE INNER COVER FABRIC
OF THE ROOF OF VEHICLES, ESPECIALLY
PASSENGER MOTOR VEHICLES
Filed March 19, 1968

INVENTOR
WALTER WOLF

BY *Craig & Antonelli*

ATTORNEYS

United States Patent Office 3,524,675
Patented Aug. 18, 1970

3,524,675
SECURING ARRANGEMENT OF THE ROD FOR THE INNER COVER FABRIC OF THE ROOF OF VEHICLES, ESPECIALLY PASSENGER MOTOR VEHICLES
Walter Wolf, Sindelfingen, Wurttemberg, Germany, assignor to Daimler-Benz Aktiengesellschaft, Stuttgart-Unterturkheim, Germany
Filed Mar. 19, 1968, Ser. No. 714,318
Claims priority, application Germany, Mar. 21, 1967, D 52,584
Int. Cl. B62d 25/06
U.S. Cl. 296—137      8 Claims

ABSTRACT OF THE DISCLOSURE

An arrangement for securing the clamping rods used for the interior covering of the roof of vehicles, especially passenger motor vehicles, in which the ends of the rods are retained by means of plugs of elastically yielding material which are inserted into apertures of the fixed roof frame and are each provided with an insert aperture receiving a rod end.

BACKGROUND OF THE INVENTION

Figure 1:
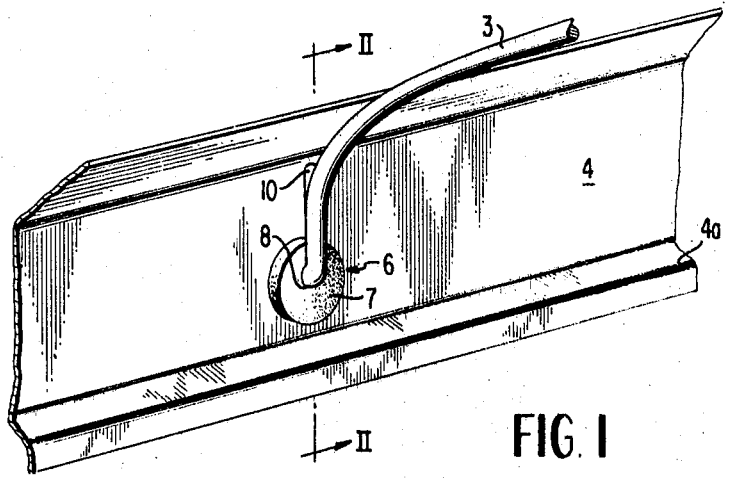

The present invention relates to a fastening arrangement of the tensioning or clamping rods for the inner coverings of the roof of vehicles, especially of passenger motor vehicles, and aims at eliminating the difficulties which occur with the fastening of the clamping or tensioning rods at the fixed roof edge which serve for the retention of the roof covers or linings, also referred to as ceiling or sky, which consist of fabrics, synthetic resinous plastic materials or the like.

The installation of the rods made from spring steel is oftentimes cumbersome and entails additional refinishing work with series production, in particular also by reason of the fact that dimensional differences occur in the roof frames of the individual vehicle bodies so that the rods are stressed either excessively or inadequately.

Heretofore the tensioning or clamping rods were secured at their ends in the roof frame within vertical elongated apertures. Dimensional differences were thereby compensated for by means of filler plugs or pins which came to lie between the respective rod end and the end of the elongated aperture.

Disadvantageous are, in addition to the additional, costly assembly-time and to the selection of the respectively required thickness of the filler plug, the bearing support of the filler plug and the fact that the selection of the correct filler plug is omitted at times for reasons of lack of time or no filler plug at all is inserted, which later on leads to complaints by reason of poorly stressed and clamped roof coverings and therewith to refinishing operations and costs resulting therefrom. The difficulties of the correct rod fastening occur to an increased extent with presently used extremely flat roofs which requires a particularly accurate adaptation and fitting of the rod position to the contour of the roof.

SUMMARY OF THE INVENTION

For purposes of avoiding the aforementioned disadvantages, the rod end is retained according to the present invention in an aperture of the rigid roof frame by means of a plug of elastically yielding material, for example, of soft rubber, having an insert aperture.

It is advantageous if the insert aperture, constructed in particular as dead-end bore or opening, is not arranged in the center of the plug but above the center thereof because a deflection of the rod in the downward direction is possible thereby without difficulty whereas a deflection of the rod in the upward direction would reach very quickly its limit by the roof sheet metal structure.

Accordingly, it is an object of the present invention to provide a fastening and securing arrangement for the stretching rods used for stretching the roof coverings of vehicles which avoids by simple means the aforementioned shortcomings and drawbacks encountered in the prior art.

Another object of the present invention resides in a securing arrangement of the rods for the interior coverings of the sky of vehicles which obviates the need of time-consuming and troublesome refinishing operations due to the occurrence of dimensional differences of the vehicle bodies.

A further object of the present invention resides in a fastening arrangement of the tightening rods for the interior covering of the roof of a passenger motor vehicle which assures correct stressing of the interior fabric or material under all circumstances without regard to dimensional tolerances of the vehicle body.

Still a further object of the present invention resides in a securing arrangement for the stretching rods used with the interior covering material for the roof of vehicles which can be used in particular for the relatively flat roofs of present-day vehicle constructions.

Figure 2:
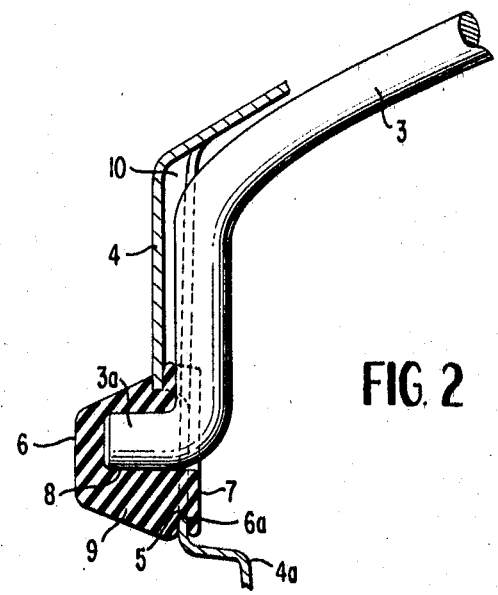

These and other objects, features, and advantages of the present invention will become more obvious from the following description when taken in connection with the accompanying drawing which shows, for purposes of illustration only, one embodiment in accordance with the present invention, and wherein:

FIG. 1 is a partial, perspective view on the securing place of the end of a clamping rod for the roof cover fabric (sky) of a motor vehicle; and FIG. 2 is a partial cross-sectional view, an an enlarged scale and taken along line II—II of FIG. 1.

Referring now to the drawing wherein like reference numerals are used throughout the two views to designate like parts, the clamping rod designated in the two views by reference numeral 3 which may be of any conventional construction as regards its material and cross-sectional shape, is secured with its outwardly bent end 3a at the inner sheet metal panel 4 of the lateral bearer of the fixed roof frame. For this purpose, the lateral sheet metal panel 4, which is angularly bent once or several times for the purposes of its reinforcement, is provided at the securing place with a circular aperture 5 which is cut-in near the lower, doubly bent portion 4a of the inner sheet metal panel 4 of the roof lateral bearer in order to minimize as much as possible any weakening thereof and the danger of a tearing in the sheet metal panel 4.

A plug 6 of soft rubber or the like with high climatic resistance is inserted into the aperture 5. The plug 6, which is approximately cap-shaped in its longitudinal cross section, is provided at its base surface 7, which projects into the vehicle interior, with a dead-end bore or opening 8. The opening 8 is displaced upwardly from the center of the plug 6.

When the pin-shaped, horizontally outwardly directed end 3a of the clamping rod 3 is pressed into the dead-end aperture 8, wherein the latter is slightly enlarged. The plug 6, thus reinforced within the groove 6a, is thereby pressed against the edge of the aperture 5.

If the distance of the two lateral bearers during the manufacture of the vehicle body should have turned out to be too small compared to the intended dimension, then the rubber is compressed in the larger rubber area 9 below the dead-end aperture 8 and will deflect laterally in the upward direction. The dead-end aperture 8 has then been displaced downwardly for the equalization at the rod length.

The sheet metal panel 4 may be provided with a groove 10 which serves for the reinforcement and partial accommodation of the rod 3.

Of course, the plugs and apertures may also be constructed of triangular or rectangular shape. However, a circular aperture 5 can be manufactured in a simple manner while a construction of truncated conical shape on the part of the plug simplifies a mass production and renders the same less costly. However, for a preferred use of the circular shape speaks also the fact that a plug so constructed absorbs and transmits most uniformly the forces exerted thereon in different directions and permits displacements of the end of the rod in all directions without strain.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A securing arrangement of clamping rods for the inner covering of the roof of vehicles with a fixed roof frame, especially of passenger motor vehicles, wherein the improvement comprises plug means made of elastically yielding material, said plug means being inserted into a corresponding substantially horizontal aperture of the fixed roof frame, and the end of the clamping rod being inserted into an aperture provided in said plug means, whereby the inner covering is correctly stressed without regard to dimensional tolerances of the vehicle body.

2. A securing arrangement according to claim 1, wherein the roof frame includes a lateral bearer member, the base surface of said plug means projects into the vehicle interior, and said plug means is retained in the aperture of the roof lateral bearer member by means of a groove provided in the plug means along its circumference.

3. A securing arrangement of clamping rods for the inner covering of the roof of vehicles with a fixed roof frame especially of passenger motor vehicles, wherein the improvement comprises plug means made of elastically yielding material, said plug means being inserted into a corresponding aperture of the fixed roof frame, the end of the clamping rod being inserted into an aperture provided in said plug means, the roof frame includes a lateral bearer member, the base surface of said plug means projects into the vehicle interior, and said plug means is retained in the aperture of the roof lateral member by means of a groove provided in the plug means along its circumference, wherein the aperture is a dead-end hole provided in the plug means above the center of the plug means.

4. A securing arrangement according to claim 3, wherein said plug means is constructed approximately in the shape of a truncated cone in longitudinal cross section.

5. A securing arrangement of the clamping rods for the inner covering of the roof of vehicles with a fixed roof frame, especially of passenger motor vehicles, wherein the improvement comprises plug means made of elastically yielding material, said plug means being inserted into a corresponding aperture of the fixed roof frame, and the end of the clamping rod being inserted into an aperture provided in said plug means, wherein the aperture is a dead-end hole provided in the plug means above the center of the plug means to receive the essentially horizontally extending rod end.

6. A securing arrangement according to claim 5, wherein said plug means is constructed approximately in the shape of a truncated cone in longitudinal cross section.

7. A securing arrangement according to claim 1, wherein said plug means is constructed approximately in the shape of a truncated cone in longitudinal cross section.

8. A securing arrangement according to claim 7, wherein said aperture and said plug means are essentially circularly shaped.

References Cited

UNITED STATES PATENTS

| | | | |
|---|---|---|---|
| 2,239,318 | 4/1941 | Haberstump | 296—137 |
| 2,943,373 | 7/1960 | Rapata | 24—216 |

BENJAMIN HERSH, Primary Examiner

R. R. SONG, Assistant Examiner